(12) United States Patent
Roscoe et al.

(10) Patent No.: US 11,336,464 B2
(45) Date of Patent: May 17, 2022

(54) IDENTITY AUTHENTICATION METHOD AND SYSTEM, AS WELL AS COMPUTING DEVICE AND STORAGE MEDIUM

(71) Applicant: CROSBIL LTD., Oxford (GB)

(72) Inventors: Andrew William Roscoe, Oxford (GB); Bangdao Chen, Shenzhen (CN)

(73) Assignee: CROSBIL LTD., Oxford (GB)

( * ) Notice: Subject to any disclaimer, the term of this patent is extended or adjusted under 35 U.S.C. 154(b) by 228 days.

(21) Appl. No.: 16/757,429

(22) PCT Filed: Apr. 23, 2018

(86) PCT No.: PCT/CN2018/084096
§ 371 (c)(1),
(2) Date: Apr. 20, 2020

(87) PCT Pub. No.: WO2019/067020
PCT Pub. Date: Apr. 25, 2019

(65) Prior Publication Data
US 2021/0194702 A1 Jun. 24, 2021

(30) Foreign Application Priority Data
Oct. 18, 2017 (CN) .......................... 201710971671.6

(51) Int. Cl.
*H04L 29/06* (2006.01)
*H04L 9/32* (2006.01)

(52) U.S. Cl.
CPC .......... *H04L 9/3263* (2013.01); *H04L 9/3218* (2013.01); *H04L 9/3236* (2013.01); *H04L 9/3247* (2013.01); *H04L 2209/38* (2013.01)

(58) Field of Classification Search
None
See application file for complete search history.

(56) References Cited

U.S. PATENT DOCUMENTS 5,633,929 A * 5/1997 Kaliski, Jr. ........... H04L 9/0894
380/28
6,170,058 B1 * 1/2001 Kausik ................ G06F 21/6245
713/193
(Continued)

FOREIGN PATENT DOCUMENTS

| CN | 101969377 A | 2/2011 |
| CN | 104579694 A | 4/2015 |

(Continued)

*Primary Examiner* — Jeremy S Duffield
*Assistant Examiner* — Hassan A Hussein
(74) *Attorney, Agent, or Firm* — Soroker Agmon Nordman PTE Ltd (57) ABSTRACT

The method of identity authentication at the user is provided to prove to the certificate authority that a key is owned by a user. The method can comprise selecting a certain number of keys from a set of keys of the user, obtaining a hash value of a correspondence between each key in the certain number of keys and a user identifier of the user respectively, and transmitting the obtained hash values to the certificate authority, and after receiving from the certificate authority a notification regarding a first subset of hash values, sending keys corresponding to the first subset of hash values as a first subset of keys to the certificate authority. The first subset of hash values can be selected by the certificate authority from the obtained hash values. Zero know ledge proof can be achieved with this technical solution.

19 Claims, 5 Drawing Sheets

(56) References Cited

U.S. PATENT DOCUMENTS

| | | | |
|---|---|---|---|
| 2002/0141575 A1* | 10/2002 | Hird | H04L 9/3247 380/44 |
| 2004/0199774 A1* | 10/2004 | Zissimopoulos | H04L 63/0428 713/179 |
| 2006/0085844 A1* | 4/2006 | Buer | H04L 9/30 726/4 |
| 2008/0010449 A1* | 1/2008 | Holtzman | H04L 9/3273 713/157 |
| 2008/0010451 A1* | 1/2008 | Holtzman | H04L 9/3263 713/158 |
| 2009/0313475 A1* | 12/2009 | Roscoe | H04L 63/065 713/181 |
| 2010/0169651 A1* | 7/2010 | Scheldt | H04L 9/3231 713/176 |
| 2013/0159021 A1* | 6/2013 | Felsher | G06Q 30/0283 705/3 |
| 2013/0227139 A1* | 8/2013 | Suffling | H04L 9/3226 709/225 |
| 2013/0227292 A1* | 8/2013 | Suffling | H04L 63/061 713/171 |
| 2014/0122888 A1* | 5/2014 | Yoon | H04L 63/083 713/171 |
| 2014/0149740 A1* | 5/2014 | Sato | H04L 9/006 713/158 |
| 2015/0326398 A1* | 11/2015 | Modarresi | H04L 9/32 713/181 |
| 2016/0099950 A1* | 4/2016 | Cuff | H04L 63/0838 726/7 |
| 2018/0234426 A1* | 8/2018 | Huang | H04L 9/3236 |
| 2018/0268148 A1* | 9/2018 | Kamiya | H04L 9/0894 |
| 2018/0268155 A1* | 9/2018 | Kamiya | G06F 21/335 |
| 2021/0336797 A1* | 10/2021 | Van Duren | H04L 9/0643 |
| 2021/0391986 A1* | 12/2021 | Przybylo | H04L 9/0869 |

FOREIGN PATENT DOCUMENTS

| | | |
|---|---|---|
| CN | 106102058 A | 11/2016 |
| CN | 107508686 A | 12/2017 |

* cited by examiner

IDENTITY AUTHENTICATION METHOD AND SYSTEM, AS WELL AS COMPUTING DEVICE AND STORAGE MEDIUM

TECHNICAL FIELD

The invention relates to the field of cryptography, and in particular, to a method and a system of identity authentication, and a computing device and a storage medium thereof.

BACKGROUND OF THE INVENTION

Public Key Infrastructure (PKI) is an infrastructure that supports public key management and authentication, encryption, integrity and accountability services. A simple PKI system includes a Certificate Authority (CA), a Register Authority (RA) and a corresponding PKI repository. The CA is used to issue and manage certificates. The RA can be either a part of the CA or an independent unit having a functionality including personal identity audit, Certificate Revocation List (CRL), key generation and key pair backup. The PKI repository can include a Lightweight Directory Access Protocol (LDAP) directory server and a common database to store and manage such information as user applications, certificates, keys, CRLs, and logs and provide certain query functions.

In contrast with PKI, a Time-Dependent Key Infrastructure (TKI) to which time information is built in, supports public key management and authentication, encryption, integrity and accountability services. In a TKI, a public medium such as a blockchain can serve as a CA in PKI. The public medium can ensure information published thereon not being tampered with.

With either PKI or TKI, when a user applies for a digital certificate, an authenticity thereof is required to be proved with the CA (e.g., an identity authentication).

SUMMARY OF THE INVENTION

In view of above technical problems, the disclosure provides a method and a system of identity authentication which implementing a zero-knowledge proof, and a computing device and a storage medium thereof.

In an aspect of the disclosure, a method of identity authentication at a user is provided to prove to a certificate authority that a key is owned by a user. The method can comprise selecting a certain number of keys from a set of keys of the user, obtaining a hash value of a correspondence between each key in the certain number of keys and a user identifier of the user respectively, and transmitting the obtained hash values to the certificate authority, and after receiving from the certificate authority a notification regarding a first subset of hash values, sending keys corresponding to the first subset of hash values as a first subset of keys to the certificate authority. The first subset of hash values can be selected by the certificate authority from the obtained hash values.

In some embodiments, the method of identity authentication can further comprise, after the certificate authority signs all hash values received from the user except the first subset of hash values, signing files with the keys corresponding to the hash values signed by the certificate authority.

In some embodiments, obtaining a hash value of a correspondence between each key in the certain number of keys and a user identifier of the user further comprises obtaining a hash value of a combination, the combination comprising each key in the certain number of keys and the user identifier of the user.

In some embodiments, obtaining a hash value of a correspondence between each key in the certain number of keys and a user identifier of the user further comprises obtaining a hash value of a combination, the combination comprising each key in the certain number of keys, the user identifier of the user and a publication time of said each key.

In some embodiments, the method of identity authentication can further comprise selecting a first key from the set of keys except the certain number of keys, obtaining a hash value of a correspondence between the first key and the user identifier, and obtaining a hash value of a combination respectively, the combination comprising the obtained hash value in relation to the first key, the user identifier and all keys from the certain number of keys except the first subset of keys, recording the obtained the hash value of the combination and the hash value in relation to the first key on a public medium, which the public medium being configured to ensure information published thereon not being tampered with, and releasing all keys in the certain number of keys except the first subset of keys after the certificate authority signs all the hash values received from the user except the first subset of hash values and after the hash value of the combination and the hash value in relation to the first key are recorded on the public medium.

In some embodiments, the method of identity authentication can further comprise selecting a first key from the set of keys except the certain number of keys obtaining a hash value of a correspondence between the first key and the user identifier and obtaining a hash value of a combination, the combination comprising the obtained hash value in relation to the first key, the user identifier, a publication time of the first key, and all keys from the certain number of keys except the first subset of keys, recording the obtained hash value of the combination and the hash value in relation to the first key on a public medium, which the public medium being configured to ensure information published thereon not being tampered with, and releasing all keys in the certain number of keys except the first subset of keys after the certificate authority signs all hash values received from the user except the first subset of hash values and after the hash value of the combination and the hash value in relation to the first key are recorded on the public medium.

In some embodiments, the public medium can be a blockchain.

In some embodiments, the public medium can be a bulletin board system operated by a trusted third party.

In some embodiments, the public medium can be a write-only database. A data block written to the write-only database can be irrevocable. A consensus can be reached among all users.

In some embodiments, the number of hash values in the first subset of hash values can be 15% of the number of keys in the certain number of keys.

In another aspect of the disclosure, a method of identity authentication at a certificate authority is provided to prove to a certificate authority that a key is owned by a user. The method can comprise receiving from the user hash values corresponding to a certain number of keys, selecting from the hash values a first subset of hash values and notifying the user of the first subset of hash values, obtaining a hash value of a correspondence between each key in a first subset of keys received from the user and a user identifier of the user respectively, and comparing the obtained hash value with a hash value in the first subset of hash values corresponding to said each key, and signing all hash values received from the user except the first subset of hash values if all the obtained hash values are correspondingly consistent with the hash values in the first subset of hash values.

In some embodiments, the method of identity authentication can further comprise obtaining a hash value of a correspondence between each key in a second subset of keys received from the user and the user identifier of the user respectively, and comparing the obtained hash value with a hash value in the hash values received from the user corresponding to said each key, the second subset of keys including all keys in the certain number of keys except the first subset of keys, and signing a hash value of a correspondence between a first key and the user identifier if all the hash values obtained for all keys in the second subset of keys are correspondingly consistent with the hash values received from the user.

In some embodiments, the correspondence between each key and the user identifier of the user can comprise a combination of said each key and the user identifier of the user. A correspondence between the first key and the user identifier can comprise a combination of the first key and the user identifier of the user.

In some embodiments, the correspondence between each key and the user identifier of the user can comprise a combination of said each key, the user identifier of the user and a publication time of said each key. A correspondence between the first key and the user identifier can comprise a combination of the first key, the user identifier of the user and a publication time of the first key.

In another aspect of the disclosure, a system of identity authentication is provided. The system can comprise a client and a certificate authority. A user can prove to the certificate authority via the client that a key is owned by the user. The client can select a certain number of keys from a set of keys of the user. The client can obtain a hash value of a correspondence between each key in the certain number of keys and a user identifier of the user and send the obtained hash values to the certificate authority. The certificate authority can select from the obtained hash values a first subset of hash values and notifies the client of the first subset of hash values. The client can send keys corresponding to the first subset of hash values to the certificate authority as a first subset of keys. The certificate authority can obtain a hash value of a correspondence between each key in the first subset of keys and the user identifier of the user and compare the obtained hash value with a corresponding hash value in the first subset of hash values. The certificate authority can sign all hash values received from the client except the first subset of hash values if all the obtained hash values are correspondingly consistent with the hash values in the first subset of hash values.

In some embodiments, the user can sign files via the client with keys corresponding to the hash values signed by the certificate authority.

In some embodiments, the correspondence between each key and the user identifier of the user can further comprise a combination, the combination comprising said each key and the user identifier of the user.

In some embodiments, the correspondence between each key and the user identifier of the user can further comprise a combination, the combination comprising said each key, the user identifier of the user and a publication time of said each key.

In some embodiments, the system of identity authentication can also comprise a public medium. The public medium can be configured to ensure information published thereon not being tampered. The client can select a first key from the set of keys except the certain number of keys. The client can obtain a hash value of a correspondence between the first key and the user identifier and obtain a hash value of a combination, the combination comprising the obtained hash value in relation to the first key, the user identifier and all keys from the certain number of keys except the first subset of keys. The client can record the obtained hash values of the combinations and the hash value in relation to the first key on the public medium. The client can release all keys in the certain number of keys except the first subset of keys as a second subset of keys. The certificate authority can obtain a hash value of a correspondence between each key in the second subset of keys and the user identifier and compare the obtained hash values with hash values received from the client corresponding to each key. The certificate authority can sign the hash value of the correspondence between the first key and the user identifier if all the hash values obtained for all the keys in the second subset of keys are correspondingly consistent with the hash values received from the client.

In some embodiments, the system of identity authentication can also comprise a public medium. The public media is configured to ensure information published thereon not being tampered. The client can select a first key from the set of keys except the certain number of keys. The client can obtain hash value of a correspondence between the first key and the user identifier, and obtain a hash values of a combination, the combination comprising the obtained hash value in relation to the first key, the user identifier, a publication time of the first key and all keys from the certain number of keys except the first subset of keys. The client can record the obtained hash values of the combinations and the hash value in relation to the first key on the public medium. The client can release all keys in the certain number of keys except the first subset of keys as a second subset of keys. The certificate authority can obtain a hash value of a correspondence between each key in the second subset of keys and the user identifier and compare the obtained hash values with hash values received from the client corresponding to each key. The certificate authority can sign the hash value of the correspondence between the first key and the user identifier if all the hash values obtained for all keys in the second subset of keys are correspondingly consistent with the hash values received from the client.

In some embodiments, the public medium can be a blockchain.

In some embodiments, the public medium can be a bulletin board system operated by a trusted third party.

In some embodiments, the public medium can be a write-only database. A data block written to the write-only database can be irrevocable. A consensus can be reached among all users.

In some embodiments, the number of hash values in the first subset of hash values can be 50% of the number of keys in the certain number of keys.

In another aspect of the disclosure, a computing device comprising a processor and a memory is provided. The memory can have a computer program stored thereon. The computer program, when executed by the processor, can implement the method of identity authentication as described hereinabove in the disclosure.

In another aspect of the disclosure, a machine-readable storage medium is provided. The machine-readable storage medium can comprise a computer program stored thereon. The computer program, when executed by a processor, can implement the method of identity authentication as described hereinabove in the disclosure.

The technical solution provided in the disclosure can be beneficial over prior art in various aspects:

In an aspect, the user can prove to the certificate authority that the user is the real owner of a key with the technical solution of the disclosure. In some instances, by sacrificing some keys (for example, the first subset of keys), the user can prove to the certificate authority that the user is the real owner of other keys (e.g., a second subset of keys). In the proofing process, the user does not provide to the certificate authority the other keys, thereby realizing zero-knowledge proof.

In another aspect, the certificate authority can select N hash values out of the received M hash values. The probability of an intruder correctly discovering the combination of keys corresponding to the N hash values is max $\{2^{-nN}, 2^{-mN}\}$, where n is the number of bits per hash value and m is the number of bits per key. Therefore, the technical solution of the disclosure is capable of resisting quantum computational attacks.

BRIEF DESCRIPTION OF THE DRAWINGS

The novel features of the invention are set forth in the appended claims. A better understanding of the features and advantages of the invention will be obtained with reference to the detailed description and drawings, which set forth the descriptive embodiments with the principle of the invention. The drawings are only for the purpose of illustrating the embodiments and should not be construed as limiting the invention. Throughout the drawings, the same elements are denoted by the same reference numerals, in the drawings

DETAILED DESCRIPTION OF THE INVENTION

Exemplary embodiments of the disclosure will be described in more detail with reference to the accompanying drawings. While the exemplary embodiments of the disclosure are shown in the drawings, it shall be understood that the invention can be embodied in various forms and not limited by the embodiments set forth herein. Rather, the embodiments are provided so that the disclosure will be more comprehensively understood, and the scope of the disclosure can be fully conveyed to those skilled in the art.

Nothing in the following detailed description is intended to suggest that any particular component, feature or process is indispensable to the present invention. Those skilled in the art will appreciate that various features or processes can be substituted or combined with each other without departing from the scope of the disclosure.

Zero-knowledge proof was proposed by S. Goldwasser et al. in early 1980s. Zero-knowledge proof is essentially an agreement involving two or more parties, e.g., a series of processes required by two or more parties to complete a task. A prover proves to and convinces a verifier that the prover knows or owns a message, however no information about the message being proved can be disclosed to the verifier in a proofing process. Numerous facts indicate that zero-knowledge proof is of great value in cryptography.

Figure 1:
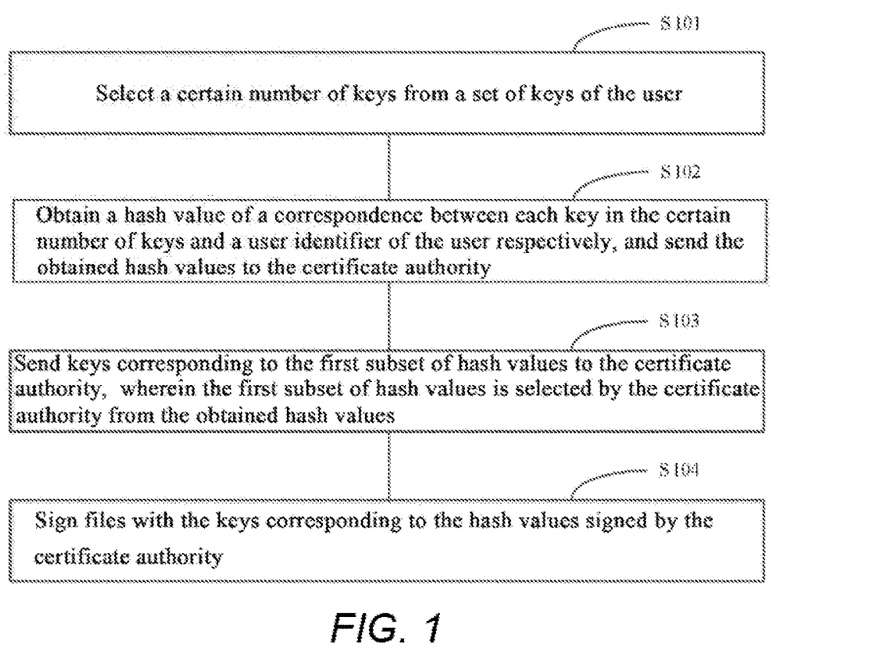
FIG. 1 illustrates a flow chart of a method of identity authentication at a user in accordance with an exemplary embodiment of the disclosure.

FIG. 1 illustrates a flow chart of a method of identity authentication at a user in accordance with an exemplary embodiment of the disclosure. The method of identity authentication is to prove to a certificate authority that a key is owned by the user. The method of identity authentication in FIG. 1 can comprise processes S101 to S103.

In process S101, a certain number of keys can be selected from a set of keys of the user.

In process S102, a hash value of a correspondence between each key in the certain number of keys and a user identifier of the user can be respectively obtained. The obtained hash values can be sent to the certificate authority.

In process S103, after receiving from the certificate authority a notification regarding a first subset of hash values, keys corresponding to the first subset of hash values can be sent to the certificate authority as a first subset of keys. The first subset of hash values can be selected by the certificate authority from the obtained hash values.

In order to prove to the certificate authority that a key is owned by the user, the user can first select a certain number of keys from a set of keys, and then respectively obtain a hash value of a correspondence between each key in the certain number of keys and the user identifier of the user. The resulting hash values can then be sent to the certificate authority. That is, it is hash values per se not the keys that are sent to the certificate authority. Upon receipt from the certificate authority of a notification regarding a first subset of hash values, the keys corresponding to the first subset of hash values can be sent to the certificate authority as a first subset of keys. As the first subset of hash values are selected by the certificate authority from the hash values it receives, the first subset of keys is a subset of the certain number of keys. The certificate authority, after receiving all the keys in the first subset of keys, can obtain a hash value of a correspondence between each key in the received keys and the user identifier of the user respectively, and then compare the obtained hash values with the corresponding hash values in the first subset of hash values. If the obtained hash values are identical to (e.g., consistent with) the corresponding hash values in the first subset of hash values, it can indicate that the user is the real owner of the certain number of keys. The certificate authority can then sign all hash values received from the user except the first subset of hash values. This way, the user can use all the keys in the certain number of keys except the first subset of keys. In the method of identity authentication in an exemplary embodiment of the disclosure, the user does not provide to the certificate authority all the keys in the certain number of keys except the first subset of keys, but can prove to the certificate authority that all the keys in the certain number of keys except the first subset of keys are owned by the user, such that zero-knowledge proof can be implemented for all the keys in the certain number of keys except those in the first subset. That said, user sacrifices the keys corresponding to the first subset of hash values, i.e., the first subset of keys. In the example, the user is the prover, while the certificate authority is the verifier.

As further shown in FIG. 1, the method of identity authentication in an exemplary embodiment of the disclosure can further comprise a process S104. In the process S104, after the certificate authority signs all hash values received from the user except the first subset of hash values, files can be signed with the keys corresponding to the hash values signed by the certificate authority. In other words, the certificate authority signs all hash values received from the user except the first subset of hash values, indicating that the certificate authority verifies the authenticity of the user, thereby the user can use the keys corresponding to the hash values signed by the certificate authority.

In some embodiments, respectively obtaining a hash value of a correspondence between each key in the certain number of keys and a user identifier of the user can further comprise respectively obtaining a hash value of a combination, which combination comprising each key in the certain number of keys and the user identifier of the user. In alternative embodiments, respectively obtaining a hash value of a correspondence between each key in the certain number of keys and a user identifier of the user can further comprise respectively obtaining a hash value of a combination, which combination comprising each key in the certain number of keys, the user identifier of the user and a publication time of said key. The publication time herein can refer to a time when each key is published or released. Whether a correspondence between a key and the user identifier of the user involves the publication time of the key can depend on the specific conditions. If the key includes the publication time thereof, the correspondence can involve the publication time. It shall be understood that, those skilled in the art can implement the correspondence between the key and the user identifier of the user in any manner known in the art or in the future. The invention is not limited in this respect. In addition, it can be understood that the combination of the key and the user identifier of the user, and/or the combination of the key, the user identifier and the publication time of the key can be implemented by concatenating them in various orders or can be implemented in any manner known in the art or in the future. The invention is not limited in this regard.

Figure 2:
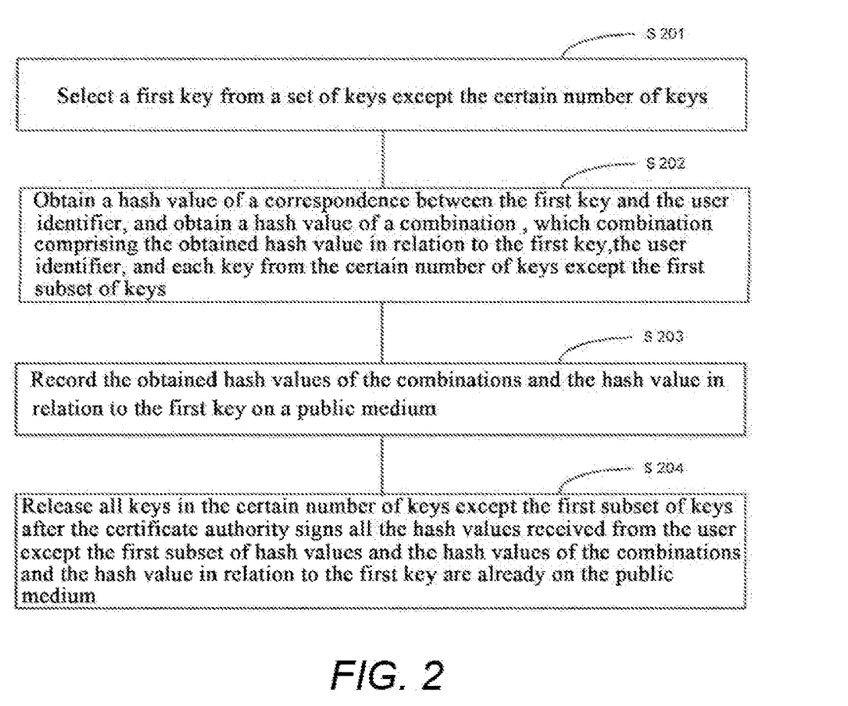
FIG. 2 illustrates a further flow chart of a method of identity authentication at a user in accordance with an exemplary embodiment of the disclosure.

FIG. 2 illustrates a further flow chart of a method of identity authentication at a user in accordance with an exemplary embodiment of the disclosure. The method of identity authentication according to an exemplary embodiment of the disclosure in FIG. 2 can further comprise processes S201 to S204.

In process S201, a first key can be selected from the set of keys except the certain number of keys.

In process S202, a hash value of a correspondence between the first key and the user identifier can be obtained. Then, a hash value of a combination can be respectively obtained, which combination comprising the obtained hash value in relation to the first key, the user identifier, and each key from the certain number of keys except the first subset of keys.

In process S203, the obtained hash values of the combinations and the hash value in relation to the first key can be recorded on a public medium. The public medium can be configured to ensure information published thereon not being tampered with.

In process S204, all keys in the certain number of keys except the first subset of keys can be released after the certificate authority signs all the hash values received from the user except the first subset of hash values and the hash values of the combinations and the hash value in relation to the first key are already on the public medium.

The first key can be any key selected from the keys in the set of keys except the certain number of keys. The first key is a key in the set of keys of the users, but not a key in the certain numbers of keys. This indicates that the user intends to prove to the certificate authority that the first key is owned by the user. The hash value of a correspondence between the first key and the user identifier can be obtained. Then, a hash value of a combination can be respectively obtained, which combination comprising the obtained hash value, the user identifier and each key from all the keys in the certain number of keys except the first subset of keys. The obtained hash values of the combinations can be subsequently recorded on the public medium. Optionally the obtained hash values of the combinations can be sent directly to the certificate authority. The public medium can ensure information published thereon not being tampered with, an authenticity of the hash values of the combinations can therefore be guaranteed. All keys in the certain number of keys except the first subset of keys can be released after the certificate authority signs all the hash values received from the user except those in the first subset of hash values and the hash values of the combinations are already on the public medium. The keys are released such that the certificate authority can further verify the authenticity of the user with these keys, enabling the user to prove to the certificate authority that the user is the real owner of the first key without providing the first key to the certificate authority. It can be understood that, the first key is a key from the set of keys except the certain number of keys. In a similar way as that discussed hereinabove with regard to the first key, the user can prove to the certificate authority that the user is aware of all the keys except the certain number of keys in the set of keys, e.g., the user is the real owner of the keys.

Figure 3:
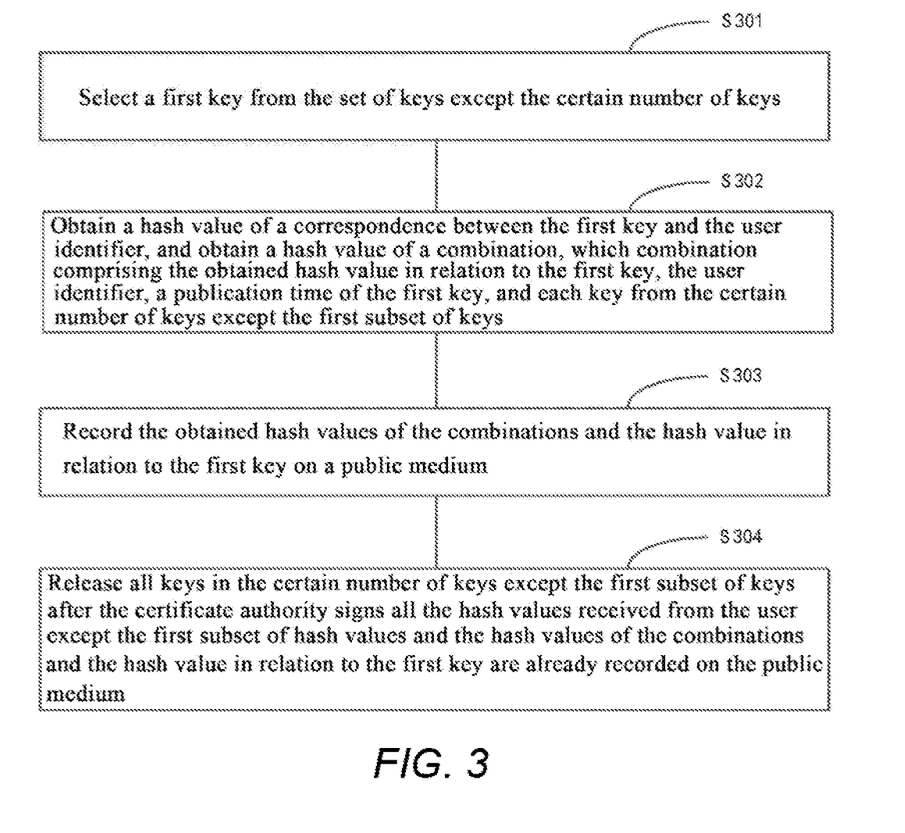
FIG. 3 illustrates still another flow chart of a method of identity authentication at a user in accordance with an exemplary embodiment of the disclosure.

FIG. 3 illustrates still another flow chart of a method of identity authentication at a user in accordance with an exemplary embodiment of the disclosure. The method of identity authentication in accordance with an exemplary embodiment of the disclosure in FIG. 3 can further comprise processes S301 to S304.

In process S301, a first key can be selected from keys in the set of keys except the certain number of keys.

In process S302, a hash value of a correspondence between the first key and the user identifier can be obtained. Then, a hash value of a combination can be respectively obtained, which combination comprising the obtained hash value in relation to the first key, the user identifier, a publication time of the first key, and each key from the certain number of keys except the first subset of keys.

In process S303, the obtained hash values of the combinations and the hash value in relation to the first key can be recorded on a public medium. The public medium can be configured to ensure information published thereon not being tampered with.

In process S304, all keys in the certain number of keys except the first subset of keys can be released after the certificate authority signs all the hash values received from the user except the first subset of hash values and the hash values of the combinations and the hash value in relation to the first key are already recorded on the public medium.

The exemplary embodiment of FIG. 3 is also to prove to the certificate authority that the first key is owned by the user. Over the exemplary embodiment described with reference to FIG. 2, the publication time of the first key is considered in the exemplary embodiment described with reference to FIG. 3 as the key has a specific publication time. For conciseness, the commonalities between the exemplary embodiment of FIG. 3 and the exemplary embodiment of FIG. 2 will not be omitted. Whether or not to introduce the publication time and/or other parameters can depend on actual conditions. The invention is not limited in this respect.

In some embodiments, the public medium can be a blockchain. A blockchain is a chained data structure formed by chronologically linking data in a series of blocks. A blockchain is also a distributed ledger on which it is cryptographically guaranteed that data is not tampered with and faked. The blockchain can use encryption techniques (e.g., hashing and signature) and consensus algorithms to establish a trust mechanism, which makes the cost of repudiation, tampering and fraud formidable, ensuring that data cannot be tampered with and faked. It can be appreciated that the blockchain can be implemented in any manner known in the art or in the future, such as Bitcoin, Ethereum, and the like.

In some embodiments, the public medium can be a bulletin board system (BBS) operated by a trusted third party (TTP). In other words, tamper-proofing of the data published on the BBS is guaranteed by the trusted third party. The trusted third party can be an organization which provides maintenance and operation services for various systems. The trusted third party can obtain a credible qualification through legal, administrative and commercial procedures. The trusted third party can be governed by relevant national regulatory bodies. In still alternative embodiments, the public medium can be a write-only database. Any data block written into the write-only database is irrevocable, and a consensus is reached among all users. The write-only database can be a database which only allows a data writing. Reaching a consensus can indicate that all users recognize an authenticity of the written data and a state of the data as not being tampered with. It shall be understood that, the public medium can be implemented in any manner known in the art or in the future as long as a tamper-proofing is ensured. The invention is not limited in this respect.

In some embodiments, the number of hash values in the first subset of hash values can be ½ of the number of keys in the certain number of keys. Assuming the user selects M keys from the set of keys of the user (e.g., the certain number of keys include M keys), the certificate authority can select M/2 hash values from the hash values received from the user. In other words, the certificate authority can select M/2 keys from the M keys and request the user to send the M/2 keys to the certificate authority. Selecting M/2 keys from M keys, (e.g., C(M, M/2)) can result in approximately $(2^M \sqrt{2})/\sqrt{(\pi M)}$ combinations. The probability for the user to correctly discover the combination of the keys corresponding to the first subset of hash values selected by the certificate authority can be about $1/((2^M\sqrt{2})/\sqrt{(\pi M)})$. In an example, if M=16 and the certificate authority selects M/2=8 keys, then the probability of the user correctly discovering the combination of the 8 keys is about 1/12870. In another example, if M=32 and the certificate authority selects M/2=16 keys, then the probability of the user correctly discovering the combination of the 16 keys is about 1/601080390. If M/2 is not an integer, then M/2 can be rounded to an integer. Therefore, the probability of the user being able to correctly discover the combination of hash values selected by the certificate authority is very low. The probability of an intruder being able to correctly discover the combination of the keys corresponding to the hash values is even lower. Therefore, the technical solution in the disclosure is able to resist quantum computing attacks.

In alternative embodiments, the number of hash values in the first subset of hash values can be ⅓ of the number of keys in the certain number of keys. Assuming the user selects M keys from the set of keys of the user (e.g., the certain number of keys contain M keys), the certificate authority can select M/3 hash values from the hash values received from the user. In other words, the certificate authority can select M/3 keys from the M keys and requests the user to send the M/3 keys to the certificate authority. Selecting M/3 keys from the M keys is C(M, M/3). The probability for the user to correctly discover the combination of the keys corresponding to the first subset of hash values selected by the certificate authority can be 1/C (M, M/3). In an example, if M=18 and the certificate authority selects M/3=6 keys, then the probability of the user correctly discovering the combination of the 6 keys is about 1/222768. In another example, if M=30 and the certificate authority selects M/3=10 keys, then the probability of the user correctly discovering the combination of the 10 keys is about 1/30045015. If M/3 is not an integer, then M/3 can be rounded to an integer. It can be understood that, the more the number of hash values in the first subset of hash values is, the lower the probability of the can correctly discovering the combination of the keys corresponding to the hash values is. Therefore, the number of hash values in the first subset of hash values can be determined based on actual needs. The invention is not limited in this regard.

Figure 4:
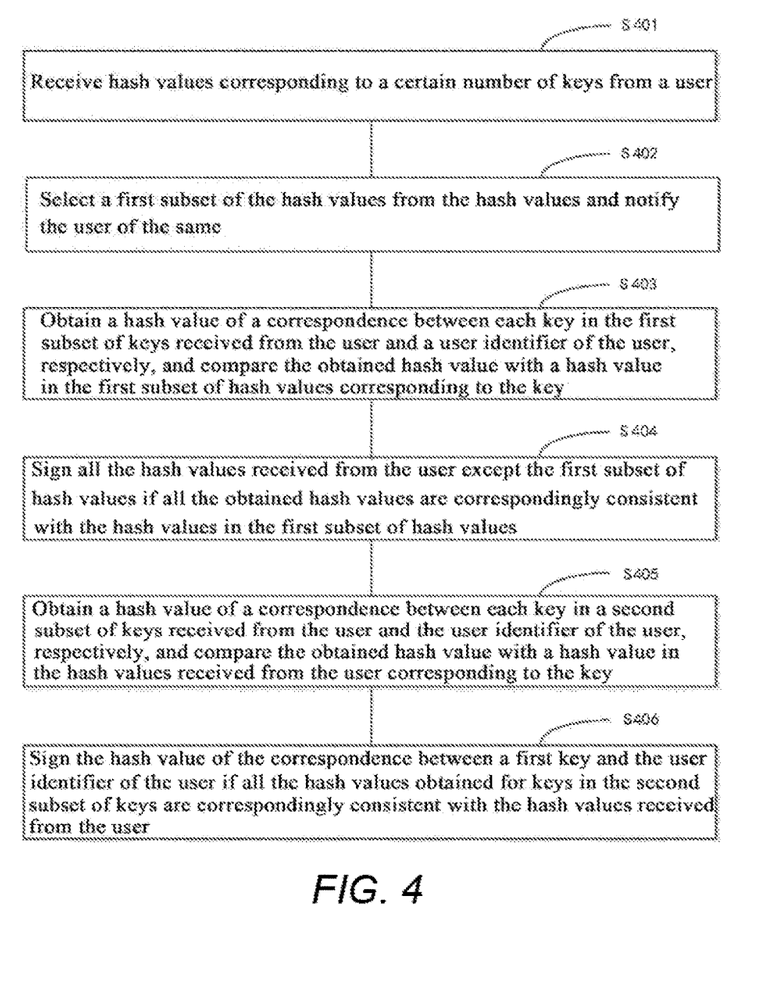
FIG. 4 illustrates a flow chart of a method of identity authentication at a certificate authority in accordance with an exemplary embodiment of the disclosure.

FIG. 4 illustrates a flow chart of a method of identity authentication at a certificate authority in accordance with an exemplary embodiment of the disclosure for proving that a key is owned by a user. The method of identity authentication in accordance with an exemplary embodiment of the disclosure in FIG. 4 can comprise the processes S401 to S404.

In process S401, hash values corresponding to a certain number of keys can be received from the user.

In process S402, a first subset of hash values can be selected from the hash values and the user can be notified of the first subset of hash values.

In process S403, a hash value of a correspondence between each key in the first subset of keys received from the user and a user identifier of the user can be respectively obtained, and the obtained hash value can be compared with a hash value in the first subset of hash values corresponding to the key.

In process S404, all the hash values received from the user except the first subset of hash values can be signed if all the obtained hash values are correspondingly consistent with the hash values in the first subset of hash values.

The certificate authority can, after receiving the hash values corresponding to the certain number of keys from the user, select the first subset of hash values and notify the user of the first subset of hash values. In an example, the certificate authority can notify the user of the sequence numbers of the hash values in the first subset of hash values. The sequence numbers can be determined based on the order in which the hash values are received by the certificate authority. Optionally, the sequence numbers can be indexes of the hash values. The invention is not limited in this respect. In another example, the certificate authority can notify the user of the hash values in the first subset of hash values. It can be appreciated that, those skilled in the art can take any form of notification as long as the user can be notified of the selection of the certificate authority. The certificate authority can, after receiving from the user a first subset of keys corresponding to the first subset of hash values, obtain a hash value of a correspondence between each key in the first subset of keys and the user identifier of the user respectively. The certificate authority can compare the obtained hash value with the hash value in the first subset of hash values corresponding to the key. In other word, the certificate authority can verify if the keys, which key are sent from the user, correspond to the hash values of the keys, which hash values are previously sent from the user. If all the hash values calculated by the certificate authority from the keys in the first subset of keys are correspondingly equal to or consistent with the hash values in the first subset of hash values, it can indicate that said certain number of keys are indeed owned by the user. In other works, the user is authentic. The certificate authority can then sign all the hash values received from the user except in the first subset of hash values. This way, from among the certain number of keys, the user can use the keys corresponding to all the hash values except the first subset of hash values.

As shown in FIG. 4, the method of identity authentication in accordance with an exemplary embodiment of the disclosure can further comprise processes S405 to S406.

In process S405, a hash value of a correspondence between each key in a second subset of keys received from the user and the user identifier of the user can be respectively obtained, and the obtained hash value can be compared with a hash value in the hash values received from the user corresponding to the key. The second subset of keys can include all keys in the certain number of keys except the first subset of keys.

In process S406, the hash value of the correspondence between a first key and the user identifier of the user can be signed if all the hash values obtained for keys in the second subset of keys are correspondingly consistent with the hash values received from the user.

The exemplary embodiment is provided to discuss a case where the user proves to the certificate authority that the user is aware of the first key that is, the user is the real owner of the first key. The first key can be a key selected by the user from the set of the keys except the certain number of keys. The user can obtain a hash value of the correspondence between the first key and the user identifier, and respectively obtain a hash value of a combination, which combination comprising the obtained hash value, the user identifier and each key from the certain number of keys except the first subset of keys. The user can then record the obtained hash values of the combinations on the public medium. Optionally, the obtained hash values of the combinations can be sent directly to the certificate authority. The user can release all the keys in the certain number of keys except the first subset of keys as the second subset of keys after the certificate authority signs all the hash values received from the user except the first subset of hash values. After the keys in the second subset of keys are available to the certificate authority, the certificate authority can verify whether the hash values that are previously received from the user and correspond to the keys in the second subset of keys are authentic. The approach of verifying whether the hash values are authentic can be the same as the approach the user obtains these hash values. If the authenticity is verified, the certificate authority can be assured that the is aware of all keys in the certain number of keys. Further, as the certain number of keys are arbitrarily selected from the set of keys, it can be assured that the user is aware of the first key. That said, the user is the real owner of the first key.

In some embodiments, the correspondence between a key and the user identifier of the user can comprise a combination of the key and the user identifier of the user, and the correspondence between the first key and the user identifier can comprise a combination of the first key and the user identifier of the user. In alternative embodiments, the correspondence between a key and the user identifier of the user can comprise a combination of the key, the user identifier of the user and a publication time of the key, and the correspondence between the first key and the user identifier can comprise a combination of the first key, the user identifier of the user and a publication time of the first key. The publication time herein can refer to the time when the key is published or released. Whether or not the correspondence involves the publication time depends on actual conditions. The invention is not limited in this respect.

Figure 5:
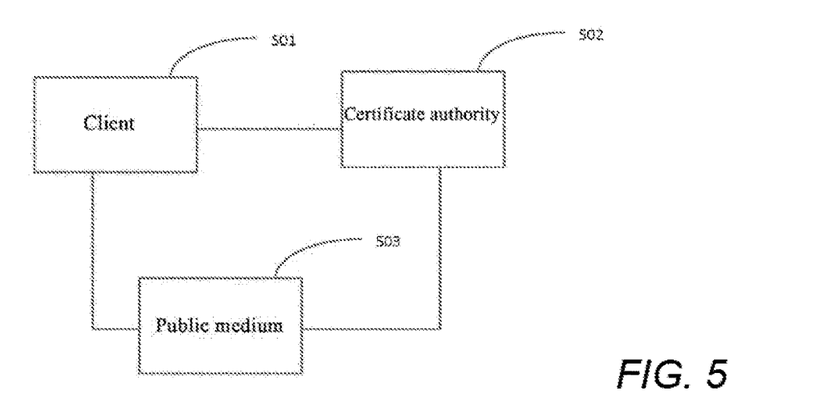
FIG. 5 illustrates a schematic diagram of a system of identity authentication in accordance with an exemplary embodiment of the disclosure.

FIG. 5 illustrates a schematic diagram of a system of identity authentication in accordance with an exemplary embodiment of the disclosure. The system of identity authentication in FIG. 5 can comprise a client 501 and a certificate authority 502. The user can prove through the client 501 to the certificate authority 502 that a key is owned by the user. The client 501 can be configured to select a certain number of keys from a set of keys of the user. The client 501 can be configured to respectively obtain a hash value of a correspondence between each key in the certain number of keys and a user identifier of the user, and send the obtained hash values to the certificate authority 502. The certificate authority 502 can be configured to select from the received hash values a first subset of hash values and notify the client 501 of the same. The client 501 can be configured to send the keys corresponding to the first subset of hash values to the certificate authority 502 as a first subset of keys. The certificate authority 502 can be configured to obtain a hash value of a correspondence between each key in the first subset of keys and the user identifier of the user respectively, and compare the obtained hash value with a corresponding hash value in the first subset of hash values. Further, the certificate authority 502 can be configured to sign all hash values received from the client 501 except the first subset of hash values if all the obtained hash values are correspondingly consistent with the hash values in the first subset of hash values. In the embodiment, if all the obtained hash values are consistent with or equal to the corresponding hash values in the first subset of hash values, it can indicate that the user is aware of the certain number of keys, that is, the user is the real owner of the certain number of keys. Further, in the process of the user proving to the certificate authority 502, the user does not provide to the certificate authority 502 all the keys in the certain number of keys except the first subset of keys (e.g., the second subset of keys), but provides the keys in the first subset of keys. That is, the user proves to the certificate authority 502 that the user is the real owner of the keys in the certain number of keys except the first subset of keys (e.g., the second subset of keys) by sacrificing the keys in the first subset of keys, thereby achieving zero-knowledge proof for all the keys in the certain number of keys except the first subset of keys.

In some embodiments, the user can sign files via the client 501 with the keys corresponding to the hash values signed by the certificate authority 502. That said, the user can use these keys.

In some embodiments, the correspondence between a key and the user identifier of the user can further comprise a combination of the key and the user identifier of the user. In alternative embodiments, the correspondence between a key and the user identifier of the user can further comprise a combination of the key, the user identifier of the user and a publication time of the key. The publication time herein can refer to the time when the key is published or released.

Whether or not the correspondence involves the publication time depends on actual conditions. The invention is not limited in this respect.

As shown in FIG. 5, the system of identity authentication in accordance with an exemplary embodiment of the disclosure can further comprise a public medium 503. The public medium 503 can be configured to ensure information published thereon not being tampered with. In some embodiments, in order to prove to the certificate authority 502 that the keys in the set of keys except the certain number of keys are owned by the user, the user can select through the client 501 a first key from the set of keys except the certain number of keys. The client 501 can then obtain a hash value of the correspondence between the first key and the user identifier and respectively obtain a hash value of a combination, which combination comprising the obtained hash value in relation to the first key, the user identifier and each key from all the keys in the certain number of keys except the first subset of keys. The client 501 can record the obtained hash values of the combinations and the hash value in relation to the first key on the public medium 503. The client 501 can then release all keys in the certain number of keys except the first subset of keys as a second subset of keys. The certificate authority 502 can respectively obtain a hash value of a correspondence between each key of the second subset of keys and the user identifier, and compare the obtained hash value with a hash value received from the client corresponding to the key. The certificate authority 502 can sign the hash value of the correspondence between the first key and the user identifier if the hash values obtained for all the keys in the second subset of keys are consistent with the corresponding hash values received from the client 501. It can be understood that, the first key is a key from the set of keys except the certain number of keys. In a similar way as that discussed hereinabove with regard to the first key, the user can prove to the certificate authority that the user is aware of all the keys except the certain number of keys in the set of keys, e.g., the user is the real owner of the keys.

In some embodiments, in order to prove to the certificate authority 502 that the keys in the set of keys except the certain number of keys are owned by the user, the client 501 can further select a first key from the set of keys except the certain number of keys. The client 501 can obtain a hash value of a correspondence between the first key and the user identifier, and obtain a hash values of a combination respectively, which combination comprising the obtained hash value in relation to the first key, the user identifier, a publication time of the first key and each key from all the keys in the certain number of keys except the first subset of keys. The client 501 can then record the obtained hash values of the combinations and the hash value in relation to the first key on the public medium 503. Subsequently, the client 501 can then release all keys in the certain number of keys except the first subset of keys as a second subset of keys. The certificate authority 502 can obtain a hash value of a correspondence between each key from the second subset of keys and the user identifier respectively, and compare the obtained hash value with a hash value received from the client 501 corresponding to the key. The certificate authority 502 can, if the hash values obtained for all the keys in the second subset of keys are correspondingly consistent with the hash values received from the client 501, sign the hash value of the correspondence between the first key and the user identifier. The publication time herein can refer to the time when the key is published or released. Whether or not the correspondence involves the publication time depends on actual conditions. The invention is not limited in this respect.

In some embodiments, the public medium 503 can be a blockchain. A blockchain is a chained data structure formed by chronologically linking data in a series of blocks. A blockchain is also a distributed ledger on which it is cryptographically guaranteed that data is not tampered with and faked. The blockchain can use encryption techniques (e.g., hashing and signature) and consensus algorithms to establish a trust mechanism, which makes the cost of repudiation, tampering and fraud formidable, ensuring that data cannot be tampered with and faked. It can be appreciated that the blockchain can be implemented in any manner known in the art or in the future, such as Bitcoin, Ethereum, and the like.

In some embodiments, the public medium 503 can be a bulletin board system (BBS) operated by a trusted third party (TTP). In other words, tamper-proofing of the data published on the BBS is guaranteed by the trusted third party. The trusted third party can be an organization which provides maintenance and operation services for various systems. The trusted third party can obtain a credible qualification through legal, administrative and commercial procedures. The trusted third party can be governed by relevant national regulatory bodies. In still alternative embodiments, the public medium 503 can be a write-only database. Any data block written into the write-only database is irrevocable, and a consensus is reached among all users. The write-only database can be a database which only allows a data writing. Reaching a consensus can indicate that all users recognize an authenticity of the written data and a state of the data as not being tampered with. It shall be understood that, the public medium can be implemented in any manner known in the art or in the future as long as a tamper-proofing is ensured. The invention is not limited in this respect.

In some embodiments, the number of hash values in the first subset of hash values can be ½ of the number of keys in the certain number of keys. Assuming the user selects M keys from the set of keys of the user (e.g., the certain number of keys include M keys), the certificate authority 502 can select M/2 hash values from the hash values received from the user. In other words, the certificate authority 502 can select M/2 keys from the M keys and request the user to send the M/2 keys to the certificate authority 502. Selecting M/2 keys from M keys, (e.g., C(M, M/2)) can result in approximately $(2^M/\sqrt{2})/\sqrt{(\pi M)}$ combinations. The probability for the user to correctly discover the combination of the keys corresponding to the first subset of hash values selected by the certificate authority 502 can be about $1/((2^M/\sqrt{2})/\sqrt{(\pi M)})$. In an example, if M=16 and the certificate authority 502 selects M/2=8 keys, then the probability of the user correctly discovering the combination of the 8 keys is about 1/12870. In another example, if M=32 and the certificate authority 502 selects M/2=16 keys, then the probability of the user correctly discovering the combination of the 16 keys is about 1/601080390. If M/2 is not an integer, then M/2 can be rounded to an integer. Therefore, the probability of the user being able to correctly discover the combination of hash values selected by the certificate authority 502 is very low. The probability of an intruder being able to correctly discover the combination of the keys corresponding to the hash values is even lower. Therefore, the technical solution in the disclosure is able to resist quantum computing attacks.

In alternative embodiments, the number of hash values in the first subset of hash values can be ⅓ of the number of keys in the certain number of keys. Assuming the user selects M keys from the set of keys of the user (e.g. the certain number of keys contain M keys), the certificate authority can select M/3 hash values from the hash values received from the user. In other words, the certificate authority can select M/3 keys from the M keys and requests the user to send the M/3 keys to the certificate authority. Selecting M/3 keys from the M keys is C(M, M/3). The probability for the user to correctly discover the combination of the keys corresponding to the first subset of hash values selected by the certificate authority can be 1/C (M, M/3). In an example, if M=18 and the certificate authority selects M/3=6 keys, then the probability of the user correctly discovering the combination of the 6 keys is about 1/222768. In another example, if M=30 and the certificate authority selects M/3=10 keys, then the probability of the user correctly discovering the combination of the 10 keys is about 1/30045015. If M/3 is not an integer, then M/3 can be rounded to an integer. It can be understood that, the more the number of hash values in the first subset of hash values is, the lower the probability of the can correctly discovering the combination of the keys corresponding to the hash values is. Therefore, the number of hash values in the first subset of hash values can be determined based on actual needs. The invention is not limited in this regard.

Figure 6:
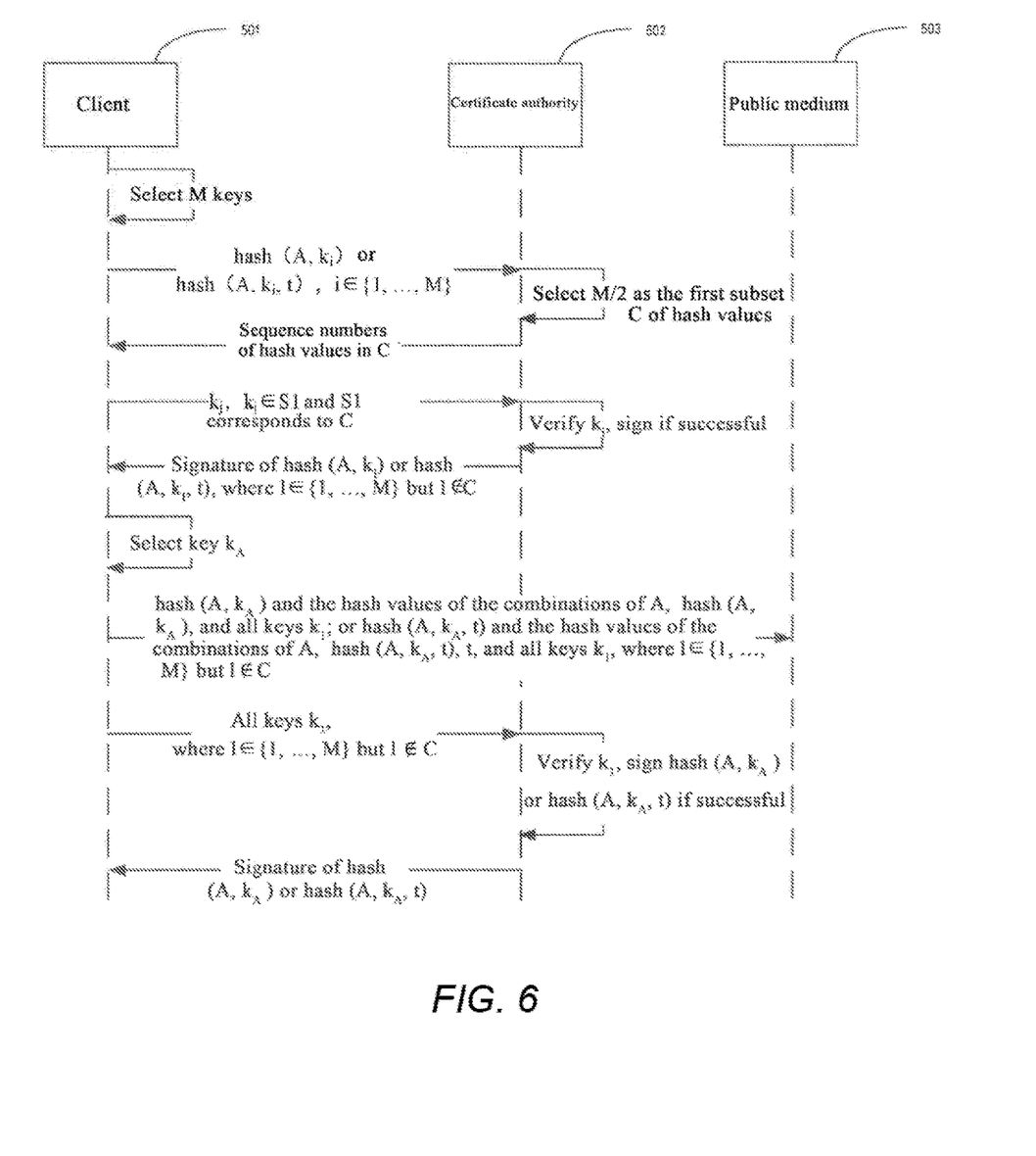
FIG. 6 illustrates a schematic diagram of an interaction between the client, the certificate authority and the public medium shown in FIG. 5.

FIG. 6 illustrates a schematic diagram of an interaction between the client 501, the certificate authority 502 and the public medium 503 shown in FIG. 5. In the exemplary example, a user Alice intends to prove to certificate authority 502 via the client 501 that she is the real owner of a key. The user identifier of the user Alice is A, with a set of keys of the user being S. The client 501 can select M keys from the set of keys S, which M keys being $k_1, k_2, \ldots, k_M$. Then, a hash value of a correspondence between each key in the M keys and the user identifier A of the user Alice can be obtained, respectively, denoted as hash $(A, k_i)$ or hash $(A, k_i, t)$, where $i \in \{1, \ldots, M\}$. As shown in FIG. 6, the client 501 can be configured to send hash $(A, k_i)$ or hash $(A, k_i, t)$ corresponding to the M keys to the certificate authority 502, from which the certificate authority 502 can select M/2 hash values as a first subset C of the hash values (in this example, M is an even number). The certificate authority 502 can notify the client 501 of the sequence numbers of the hash values in the first subset C of the hash values. Assuming that the first subset C of the hash values includes hash $(A, k_j)$ or hash $(A, k_j, t)$, then j can be notified to the client 501. It can be understood that, once the first subset C of the hash values are determined, the corresponding first subset S1 of the can also be determined, where $k_j \in S1$. The client 501 can send $k_j$ to the certificate authority 502. The certificate authority 502 can verify, e.g., by calculating in the same way as the client 501 calculates the hash values of the correspondences between kj and the user identifier A. If the client 501 initially sending hash $(A, k_j)$ to the certificate authority 502, then the certificate authority 502 calculates hash $(A, k_j)$, e.g., calculating the hash values of the combinations of A and $k_j$. If, however, the client 501 initially sending hash $(A, k_j, t)$ to the certificate authority 502, then the certificate authority 502 calculates hash $(A, k_j, t)$. The obtained results can be compared with the hash $(A, k_j)$ or hash $(A, k_j, t)$ which are received from the client 501. If the calculated hash values are equal to the hash valued received from the client 501, it indicates that the user is aware of the key $k_j$. Since the first subset C of the hash values are arbitrarily selected by the certificate authority 502, the user can be proved as the real owner of the M keys. So far, the certificate authority 502 can sign all hash values received from the client 501 except the first subset C of the hash values. In other words, the certificate authority 502 can sign hash $(A, k_1)$ or hash $(A, k_1, t)$, where $1 \in \{1, \ldots, M\}$ but $1 \notin C$. Once receiving the signatures of the certificate authority 502, the user can use the keys in the M keys except the first subset S1 of keys. In addition, in order to prove to the certificate authority 502 that a key $k_A$ in the set of keys S except the M keys is owned by the user, where key $k_A \in (S-S0)$, S0 being the set of the M keys, as shown in FIG. 6, the client 501 can record on the public medium 503 a hash $(A, k_A)$ and hash values of combinations of the user identifier, hash $(A, k_A)$ and all keys $k_1$ $(1 \in \{1, \ldots, M\}$ but $1 \notin C)$. Optionally, the client 501 can record on the public medium 503 a hash $(A, k_A, t)$ and hash values of combinations of the user identifier, hash $(A, k_A, t)$, publication time t, and all keys $k_1$ $(1 \in \{1, \ldots, M\}$ but $1 \notin C)$, where t representing the publication time of the key $k_A$. The client 501 can then release till keys $k_1$, where $1 \in \{1, \ldots, M\}$ but $1 \notin C$. The certificate authority 502, after obtaining the keys $k_1$, can verify the keys $k_1$. If all the hash values of the correspondences between the keys $k_1$ and the user identifier A are correspondingly equal to or consistent with the hash values previously received from the client 501, it indicates that the user Alice is indeed the real owner of the keys $k_1$, and thus user Alice is also the real owner of the key $k_A$. Therefore, the certificate authority 502 can sign the hash $(A, k_A)$ or the hash $(A, k_A, t)$.

Figure 7:
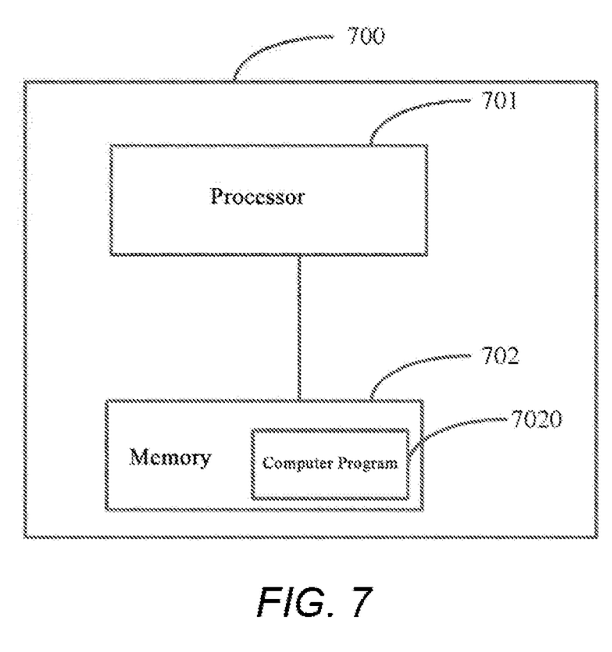
FIG. 7 illustrates a schematic diagram of a computing device in accordance with an exemplary embodiment of the disclosure.

An aspect of the disclosure provides a computing device. FIG. 7 illustrates a schematic diagram of a computing device in accordance with an exemplary embodiment of the disclosure. The computing device 700 of FIG. 7 can comprise a memory 702 and a processor 701. The memory 702 can have a computer program 7020 stored thereon. The computer program 7020, when executed by the processor 701, can implement the method of identity authentications described hereinabove. A description to the method of identity authentications is provided herein above.

In another aspect of the disclosure, a machine-readable storage medium is also provided. The machine-readable storage medium can comprise a computer program stored thereon. The computer program, when executed by a processor, implements the method of identity authentications described above. The technical solutions of the method of identity authentications have been described in detail above, and therefore will not be described herein again. In some embodiments, the machine-readable storage medium can be a tangible component provided in a digital processing device. In alternative embodiments, the machine-readable storage medium can be optionally removable from the digital processing device. In some embodiments, non-limiting examples of the machine-readable storage medium can include a USB drive, a removable hard disk, a Read-Only Memory (ROM), and a Random Access Memory (RAM), a Flash Memory, a Programmable Read Only Memory (PROM), an Erasable Programmable Read Only Memory (EPROM), a Solid State Memory, a disk, an optical disk, a cloud computing system or service.

It shall be understood that the various processes recited in the method embodiments of the disclosure can be performed in a different order and/or in parallel. Moreover, the method embodiments can include additional processes and/or omit an illustrated process. The scope of the invention is not limited in this respect.

Numerous specific details are set forth in the description provided in the disclosure. However, it shall be understood that embodiments of the disclosure can be practiced without these specific details. Known methods, structures and techniques are not shown in detail in some embodiments so as not to obscure the understanding of the present specification.

While the exemplary embodiments of the present invention have been shown and described herein, it is understood that numerous variations, changes and substitutions will now occur to those skilled in the art without departing from the present invention. It should be understood that various alternatives to the embodiments of the present invention described herein can be employed in practicing the present invention. It is intended that the following claims define the scope of the invention and methods, structures within the scope of the claims, and their equivalents be covered thereby.

What is claimed is:

1. A method of identity authentication at a user for proving to a certificate authority that a key is owned by the user, the method comprising:
   selecting a certain number of keys from a set of keys of the user;
   obtaining a hash value of a correspondence between each key in the certain number of keys and a user identifier of the user respectively, and transmitting the obtained hash values to the certificate authority; and
   after receiving from the certificate authority a notification regarding a first subset of hash values, sending keys corresponding to the first subset of hash values as a first subset of keys to the certificate authority, wherein the first subset of hash values is selected by the certificate authority from the obtained hash values;
   selecting a first key from the set of keys except the certain number of keys;
   obtaining a hash value of a correspondence between the first key and the user identifier, and obtaining a hash value of a combination respectively, the combination comprising the obtained hash value in relation to the first key, the user identifier and all keys from the certain number of keys except the first subset of keys;
   recording the obtained the hash value of the combination and the hash value in relation to the first key on a public medium, wherein the public medium is configured to ensure information published thereon not being tampered with; and
   releasing all keys in the certain number of keys except the first subset of keys after the certificate authority signs all the hash values received from the user except the first subset of hash values and after the hash value of the combination and the hash value in relation to the first key are recorded on the public medium.

2. The method of identity authentication of claim 1, further comprising, after the certificate authority signs all hash values received from the user except the first subset of hash values, signing files with the keys corresponding to the hash values signed by the certificate authority.

3. The method of identity authentication of claim 1, wherein obtaining the hash value of a correspondence between each key in the certain number of keys and the user identifier of the user further comprises obtaining a hash value of a combination, the combination comprising each key in the certain number of keys and the user identifier of the user.

4. The method of identity authentication of claim 1, wherein obtaining the hash value of a correspondence between each key in the certain number of keys and the user identifier of the user further comprises obtaining a hash value of a combination, the combination comprising each key in the certain number of keys, the user identifier of the user and a publication time of each key.

5. The method of identity authentication of claim 1, wherein the combination further comprising a publication time of the first key.

6. The method of identity authentication of claim 1, wherein a number of hash values in the first subset of hash values is 50% of the number of keys in the certain number of keys.

7. A method of identity authentication at a certificate authority for proving to a certificate authority that a key is owned by a user, the method comprising:
   receiving from the user hash values corresponding to a certain number of keys from a set of keys, wherein each of said hash values are of a correspondence between each key in the certain number of keys received from the user and a user identifier of the user respectively;
   selecting from the received hash values a first subset of hash values and notifying the user of the first subset of hash values;
   receiving from the user keys corresponding to the first subset f hash values as a first subset of keys;
   receiving from the user a first key from the set of keys except the certain number of keys;
   obtaining a hash value of a correspondence between each key in the first subset of keys received from the user and a user identifier of the user respectively, and comparing the obtained hash value with a hash value in the first subset of hash values corresponding to said each key;
   receiving from the user a hash value of a correspondence between the first key and the user identifier, and a hash value of a combination respectively, the combination comprising the received hash value in relation to the first key, the user identifier and all keys from the certain number of keys except the first subset of keys;
   recording the received the hash value of the combination and the hash value in relation to the first key on a public medium, wherein the public medium is configured to ensure information published thereon not being tampered with;
   and
   signing all hash values received from the user except the first subset of hash values when all the obtained hash values are correspondingly consistent with the hash values in the first subset of hash values.

8. The method of identity authentication of claim 7, further comprising:
   obtaining a hash value of a correspondence between each key in a second subset of keys received from the user and the user identifier of the user respectively, and comparing the obtained hash value with a hash value in the hash values received from the user corresponding to each key, wherein the second subset of keys include all keys in the certain number of keys except the first subset of keys; and
   signing a hash value of a correspondence between the first key and the user identifier when all the hash values obtained for all keys in the second subset of keys are correspondingly consistent with the hash values received from the user.

9. The method of identity authentication of claim 8, wherein the correspondence between each key and the user identifier of the user comprises a combination of each key and the user identifier of the user, and wherein a correspondence between the first key and the user identifier comprises a combination of the first key and the user identifier of the user.

10. The method of identity authentication of claim 8, wherein the correspondence between each key and the user identifier of the user comprises a combination of each key, the user identifier of the user and a publication time of said each key, and wherein the correspondence between the first key and the user identifier comprises a combination of the first key, the user identifier of the user and a publication time of the first key.

11. A computing device comprising a processor and a memory, wherein the memory has a computer program stored thereon, the computer program, when executed by the processor, implements the method of claim 7.

12. A non-transitory machine-readable storage medium having a computer program stored thereon, wherein the computer program, when executed by a processor, implements the method of claim claim 7.

13. A system of identity authentication, comprising a client, a certificate authority and a public medium, a user proving to the certificate authority through the client that a key is owned by the user,
    wherein the system of identity authentication comprising:
        at least one memory storing a plurality of instructions;
        one or more hardware processors communicatively coupled with the at least one memory,
    wherein the client selects a certain number of keys from a set of keys of the user;
    wherein the client obtains a hash value of a correspondence between each key in the certain number of keys and a user identifier of the user and sends the obtained hash values to the certificate authority;
    wherein the certificate authority selects from the obtained hash values a first subset of hash values and notifies the client of the first subset of hash values;
    wherein the client sends keys corresponding to the first subset of hash values to the certificate authority as a first subset of keys;
    wherein the certificate authority obtains a hash value of a correspondence between each key in the first subset of keys and the user identifier of the user and compares the obtained hash value with a corresponding hash value in the first subset of hash values; and
    wherein the certificate authority signs all hash values received from the client except the first subset of hash values when all the obtained hash values are correspondingly consistent with the hash values in the first subset of hash values;
wherein the public medium is configured to ensure information published thereon not being tampered, and
    wherein the client selects a first key from the set of keys except the certain number of keys,
    wherein the client obtains a hash value of a correspondence between the first key and the user identifier and obtains a hash value of a combination, the combination comprising the obtained hash value in relation to the first key, the user identifier and all keys from the certain number of keys except the first subset of keys,
    wherein the client records the obtained hash values of the combinations and the hash value in relation to the first key on the public medium,
    wherein the client releases all keys in the certain number of keys except the first subset of keys as a second subset of keys.

14. The system of identity authentication of claim 13, wherein the user signs files via the client with keys corresponding to the hash values signed by the certificate authority.

15. The system of identity authentication of claim 13, wherein the correspondence between each key and the user identifier of the user further comprises a combination, the combination comprising each key and the user identifier of the user.

16. The system of identity authentication of claim 13, wherein the correspondence between each key and the user identifier of the user further comprises a combination, the combination comprising each key, the user identifier of the user and a publication time of said each key.

17. The system of identity authentication of claim 13, further comprising
    wherein the certificate authority obtains a hash value of a correspondence between each key in the second subset of keys and the user identifier and compares the obtained hash values with hash values received from the client corresponding to the each key, and
    wherein the certificate authority signs the hash value of the correspondence between the first key and the user identifier when all the hash values obtained for all the keys in the second subset of keys are correspondingly consistent with the hash values received from the client.

18. The system of identity authentication of claim 13, wherein the combination further comprising a publication time of the first key
    and wherein the certificate authority obtains a hash value of a correspondence between each key in the second subset of keys and the user identifier and compares the obtained hash values with hash values received from the client corresponding to the each key, and
    wherein the certificate authority signs the hash value of the correspondence between the first key and the user identifier when all the hash values obtained for all keys in the second subset of keys are correspondingly consistent with the hash values received from the client.

19. The system of identity authentication of claim 13, wherein the number of hash values in the first subset of hash values is 50% of the number of keys in the certain number of keys.

* * * * *